US 6,418,397 B1

(12) United States Patent
Brand et al.

(10) Patent No.: US 6,418,397 B1
(45) Date of Patent: Jul. 9, 2002

(54) DEVICE FOR MEASURING THE CONTACT FORCE IN A POWER COLLECTOR

(75) Inventors: Werner Brand; René Blaschko, both of Berlin; Olaf Mollenhauer, Iimenau; Andreas Karguth, Gotha, all of (DE)

(73) Assignee: DaimlerChrysler Rail Systems GmbH, Berlin (DE)

( * ) Notice: Subject to any disclaimer, the term of this patent is extended or adjusted under 35 U.S.C. 154(b) by 0 days.

(21) Appl. No.: 09/445,757

(22) PCT Filed: Jun. 12, 1998

(86) PCT No.: PCT/DE98/01657

§ 371 (c)(1),
(2), (4) Date: Apr. 21, 2000

(87) PCT Pub. No.: WO98/56610

PCT Pub. Date: Dec. 17, 1998

(30) Foreign Application Priority Data

Jun. 13, 1997 (JP) .......................... 197 25 906

(51) Int. Cl.⁷ ................................. B60L 5/28
(52) U.S. Cl. ..................... 702/168; 701/19; 700/275; 191/50
(58) Field of Search .................. 702/168; 700/275; 191/60.3, 85, 50, 66, 90; 701/19, 20

(56) References Cited

U.S. PATENT DOCUMENTS 5,115,405 A   5/1992  Cathala ................. 700/275

FOREIGN PATENT DOCUMENTS

| DE | 88 11 617 U | 10/1988 |
| EP | 0 363 623 A1 | 4/1990 |
| EP | 0 697 304 A2 | 2/1996 |

*Primary Examiner*—Kamini Shah
(74) *Attorney, Agent, or Firm*—Venable; Norman N. Kunitz

(57) ABSTRACT

An improved device for measuring the contact force between a contact wire and a power collector in an electrically powered vehicle, specially an electrical railway vehicle, by use of optical fiber force sensors. To this end, two compact force sensors are arranged between the base body (7) of the contact strip (6) and the pantograph rocker frame (5) or between the wearing element or shoe (8) and the base body (7) of the contact strip (6). Each sensor includes a deformable body (11), which is elastic in an axial direction but highly rigid crosswise, with the body being fitted with an integrated optical fuber reflex sensor (19). Axial deformations of the deformable body (11) equivalent to the contact force are detected by the reflex sensor (19) with high resolution, accuracy and no interference, are then signaled to a device (27) via optical fibers requiring no potential and converted therein into contact force-equivalent signals (28) or instructions (29).

20 Claims, 3 Drawing Sheets

DEVICE FOR MEASURING THE CONTACT FORCE IN A POWER COLLECTOR

BACKGROUND OF THE INVENTION

The invention relates to a device for measuring the contact force between a contact wire and a pantograph of an electrically-powered vehicle. More particularly, the present application relates to a device for measuring the contact force between a contact wire and a pantograph of an electrically-powered vehicle, particularly an electrical railway vehicle, with the device having at least one fiber-optic sensor that is suitable for ascertaining the contact force between a contact wire and a contact strip of the pantograph, and a device for sensor control and sensor-signal processing connected to the sensor or sensors for separate-potential signal transmission.

Pantographs of modern high-speed railway vehicles should be embodied as actively-controlled pantographs with respect to the contact force between the contact strip of the pantograph and the contact wire, so that an optimum level of the quality of the energy supply and the wear at the contact point between the contact wire and the contact strip can be found and maintained, regardless of the relative movements between the railway vehicle and the contact wire, the aerodynamic forces on the pantograph components as stipulated by wind and vehicle speed, and the oscillatory behavior of the pantograph, the contact wire and the chain mechanism guiding the wire. While the force component of the true contact force resulting from the vehicle-speed-dependent air flow against the pantograph components can be determined through measurements and established as a parameter function for a control algorithm, the determination of the contact force F resulting from the mechanical action of the pantograph and the overhead-contact system requires a device that determines this contact force as close as possible to the aforementioned contact point, according to its magnitude and its point of entry, and, from the measuring location, which is located at a high-voltage level (e.g., 3 kV DC voltage; 15 kV or 25 kV AC voltage), further conducts contact-pressure-equivalent signals to internal vehicle evaluation devices, which are set at the opposite potential. The term 'contact force F' refers hereinafter to this component of the true contact force between the contact wire and the contact strip, as results from the mechanical action of the pantograph and the overhead-contact system.

A generic device for determining the true contact force between a contact wire and a pantograph is described in U.S. Pat. No. 5,115,405 A. Here, a fiber-optic force sensor is mounted to the contact strip, the sensor being connected, via optical fibers (and therefore separated electrically in potential and being extensively independent of electrical and magnetic interference fields), to an internal vehicle device that supplies the sensor with light and receives its contact-force-dependent signal. The force sensor comprises an optical fiber that is clamped in spring-loaded fashion beneath the shoe that is in contact with the contact wire, and between the shoe and its holding device. A contact force that acts on the shoe leads to the deformation and micro-bending of the clamped optical fiber, altering its light-transmitting properties. This device is intended to recognize the overstepping of an upper and/or a lower threshold value of the true contact force between the contact strip and the contact wire, which is dictated, for example, by the impact of wind; the device is further intended to correct the contact force by means of an electronic-pneumatic command device and a pneumatic damping-compensation control element.

This device appears to be well-suited for detecting and signaling the overstepping of contact-force threshold values. This arrangement is, however, completely unsuitable for an effective measurement of a contact force within a specific force range, as is necessary for an active control of the contact force or the true contact force of a pantograph, because the fiber-optic force sensor has a very low signal/noise ratio, and a sufficiently precise, continuous determination of measured values is impossible. This sensor does not permit a determination of the point of entry of the contact force at the contact strip. Because the arrangement extends over the entire length of the shoe, it has a significant spatial expansion and mass, which can have a negative impact on the oscillatory and aerodynamic behavior of the pantograph.

The technical embodiment appears to be too sensitive to the types of stresses that are inevitable in the assembly, maintenance and transport of a pantograph. Because the temperature dependency of the light-transmitting properties changes with the degree of mechanical stress of an optical fiber, an effective compensation of this temperature dependency is scarcely possible. The continuously-changing mechanical stresses and deformities to which the optical fiber of this force sensor is subjected limit the service life of the fiberoptic sensor, thereby offering no guarantee of reliable device operation.

The patent publication EP 0 697 304 A2 discloses a device for measuring the contact force for an actively-controlled pantograph, in which a load recorder that measures in analog fashion and must cooperate with further length-measuring sensors to influence the action of two separately-operating vertical-lifting drives, by way of a control unit, is disposed beneath a pin-type insulator that supports the pantograph head and is disposed on a structure that swings out vertically, or the insulator is associated with the shoe. This load recorder should also be able to be constructed with the use of optical fibers; no further details are offered about the structure, arrangement and function of these fibers. At least in the arrangement of the load recorder beneath the pin-type insulator, considerable difficulties arise with respect to determining the magnitude of the contact force, because wind and mass forces acting between the points of contact and measurement affect the measurement result. It appears that the size of the load recorder, which can be seen from the drawings, makes it impossible to arrange the detector near the shoe, because this would have a negative impact on the oscillatory and aerodynamic behavior of the pantograph. It is not possible to ascertain the point of entry of the contact force at the contact strip using this load recorder.

German Patent Publication DE 195 18 123 C2 discloses a more detailed description of a device having a special optical-fiber sensor, with which mechanical pressure forces can be measured within the scope of rail technology, for example in rail-mounted axle-counting devices. This sensor has an inside tube and an outside tube, which is coaxial to the inside tube, is divided in the longitudinal direction of the tube and forms two contactless half-shells. A glass fiber that conducts light waves is embedded in helical fashion into an elastic mass between the inside tube and the outside-tube shells, and experiences a reversible bending in a certain bending-radius range during a one-sided, mechanical pressure stress of the sensor, in which the two half-shells of the outside shell are moved toward one another; this bending measurably damps an optical signal that passes through the glass fiber. This type of sensor has a complex design. It is only suitable for one stress direction, cannot be integrated as a structurally self-supporting component into the pantograph, and would be destroyed in the event of mechanical overstressing. The variable mechanical stress and deformation of the optical fiber of the sensor reduce the effectiveness of temperature-compensation measures, and likewise lead to a limitation of the service life and operating reliability. Thus, a sensor of this type appears to be unusable for measuring the contact force at a pantograph for the purpose of active pantograph control.

A further device for measuring the contact force for an actively-controllable pantograph is proposed in the German patent publication DE 195 40 913 C1. In this case, a force sensor is intended to be disposed at a telescopic strut that supports a contact strip, and an acceleration sensor is to be disposed at the rocker of a single-arm pantograph, the rocker supporting two parallel contact strips. The two sensor signals are supplied to the inputs of a control device, which initiates special torsion actuators that are disposed around the axis between the lower arm and the upper arms of the single-arm pantograph, and, in addition to the conventional lifting device of the pantograph, set the contact force of the contact strips at the contact wire. From the drawings, it can be assumed that the contact force of the contact strip at the contact wire is determined by way of a path measurement from the spring deflection of the telescopic strut, or a force sensor measures the force transmitted by the telescopic strut. A disadvantage is the relatively large distance between the sensors and the actual contact point between the contact wire and the contact strip, because mass and wind forces occurring between the contact point and the respective sensor influence the measurement results, and can skew the control result. This document, however, offers no representation of the embodiment and operating principle of the sensors.

The French magazine publication of "Delfosse, P; Sauvestre, B.: Measurement of contact pressure between pantograph and catenary," Revue Générale des Chemnins de Fer, Vol. 1, No. 6, 1983, pp. 497–506" proposes a device for measuring the contact force serving in the evaluation of the status of an overhead-contact system comprising a contact wire and a chain mechanism, and employs a specially-designed measuring-current pantograph, in which each of the two parallel contact strips is replaced by a special contact strip that is supported by two bending girders that allow the contact force acting on each contact strip to be determined by means of strain gauges and potentiometric measurement, according to both the magnitude and the point of entry of the pressure, from the torques exerted on the bending girders, which are clamped on one side. The sensors disposed in the region of the pantograph rocker and set at a high-voltage potential must be separated by potential, and with a high machinery outlay, from their energy-supply, signal-processing and control devices that are integrated into the vehicle control, and protected through special measures against electrical and magnetic interference fields. The illustrated arrangement of the force sensors has no protection against mechanical and weather influences. A structural adaptation of this device for a pantograph that is suitable for the operational use appears complicated and costly; the additional mass of the bending-girder arrangement would negatively affect the oscillatory and aerodynamic behavior of the pantograph. Therefore, this type of device with these particular sensors is not even considered for the active control of a real pantograph, or the measurement of its contact quality.

EP-0 363 623 discloses a device for measuring the contact force between a contact wire and a pantograph of an electrically-powered vehicle, namely an electrical railway vehicle, having at least one fiber-optical sensor that is suitable for ascertaining the contact force between a contact wire and a contact strip of the pantograph; a device for controlling the sensor and processing the sensor signals; and a fiber-optic device that connects these devices for separate-potential signal transmission, with two resilient deformation bodies being disposed between a base body of the contact strip and a contact strip support and fixedly connected to the two. These deformation bodies support the contact strip, and each has an integrated fiber-optic sensor that detects deformations in the deformation body that are equivalent to a contact force, and signals them to the aforementioned device for sensor control and sensor-signal processing, in which the detected deformations are converted into contact-force-equivalent signals and outputted, or from which desired commands that are equivalent to changes in contact force are derived and outputted.

SUMMARY OF THE INVENTION

It is the object of the invention to provide a solution for a generic device that utilizes the advantages that are generally anticipated in the state of the technology for fiber-optic sensors having fiber-optic signal transmission for a force measurement at a high voltage, while avoiding the disadvantages of these sensors. The fiber-optic sensor of such a device should be disposed as close as possible to the actual contact point between the pantograph and the contact wire, and be able to measure the forces occurring between the components directly and without large relative paths between the components. The solution is intended to permit a shape, size, mass and arrangement of the measuring device with the fiber-optic sensor such that the oscillatory and aerodynamic behaviors of the pantograph remain extensively undisturbed. This device is intended to permit a determination of the contact force, both according to its magnitude and its point of entry at the shoe, and generate and output signals that are equivalent to a contact force, or generate and output commands that change the contact force, the signals and commands being applicable for an actively-controlled pantograph.

These above objects generally are achieved according to the present invention by a device for measuring the contact force between a contact wire and a pantograph of an electrically-powered vehicle, particularly an electrical railway vehicle, with the device having at least one fiber-optic sensor that is suitable for ascertaining the contact force between a contact wire and a contact strip of the pantograph, and a device for sensor control and sensor-signal processing that is connected to the sensor or sensors for separate-potential signal transmission; and wherein: two resilient deformation bodies are disposed between a shoe and a base body of the contact strip and are fixedly connected to the shoe and the base body, with the deformation bodies supporting the shoe; and each deformation body having an integrated fiber-optic reflex sensor that detects contact-force-equivalent deformations of the deformation body and signals the deformations to the device for sensor control and sensor-signal processing. Advantageous modifications and embodiments ensue from the further description.

With a device of the invention, it is possible to attain such contact-force-equivalent signals, or to derive from them commands that are equivalent to a change in contact force, and output these commands, as needed for a continuous control of a pantograph by means of its lifting drive and its control device; here, the advantages that are known in principle for fiber-optic sensors and their electrical, separate-potential signal transmission are used.

The solution according to the invention permits the ascertaining of the contact force, both according to its magnitude (through summation of the signals of the two fiber-optic sensors supporting a contact strip or a shoe) and its point of entry (through comparison of the signals from the individual forces of the two fiber-optic sensors supporting a contact strip or a shoe, and the computational application of lever principles). Because it is known that contact-force peaks regularly occur where the contact wire and the chain mechanism are suspended at the catenary supports, the knowledge about the changing point of entry of the contact force can be used in a control algorithm for recognizing the zigzag course of the contact wire and determining the sequence frequency of the catenary supports, as well as its first and second derivations, and for correcting the contact force in order to prevent the aforementioned contact-force peaks.

A significant advantage of the invention is that the devices of the invention can easily be modified for applications in other technical fields in which forces, but also pressures and accelerations, between components set at a high-voltage potential are to be measured. In contrast to conventional measuring methods employing strain gauges and the potentiometric formation of measured values, or piezoelectric force recorders, the outlay for the measuring arrangement and for the signal conversion, transmission and processing can be greatly reduced.

Another notable advantage of the invention is that the components of the measuring device with the fiber-optic sensor are embodied and assembled to have the smallest-possible dimensions and mass, and can be integrated, so as to transmit a force, between the pantograph components.

A further advantage is that the embodiment of the components of the measuring device that are necessary for the devices of the invention allows them to be produced inexpensively and with reproducible properties.

A further advantage of the concept of the invention is that, for example, in the variation illustrated in the exemplary embodiment, only very small changes are necessary in the design of pantograph types that have already been thoroughly tested and are in use, so an inexpensive retrofitting of devices according to the invention can be considered for numerous electrical railway vehicles in operation.

The contact-force-equivalent signals obtained with the devices of the invention are also suitable for special measuring purposes with which, for example, the contact quality of a pantograph can be checked, or the status of an overhead line and its chain mechanism in a path segment can be assessed.

The invention is illustrated in the drawings and described below by way of an example—which is not to be interpreted as limiting—of a device for energy transmission from a contact wire to a railway vehicle.

DESCRIPTION OF THE PREFERRED EMBODIMENTS

Figure 1:
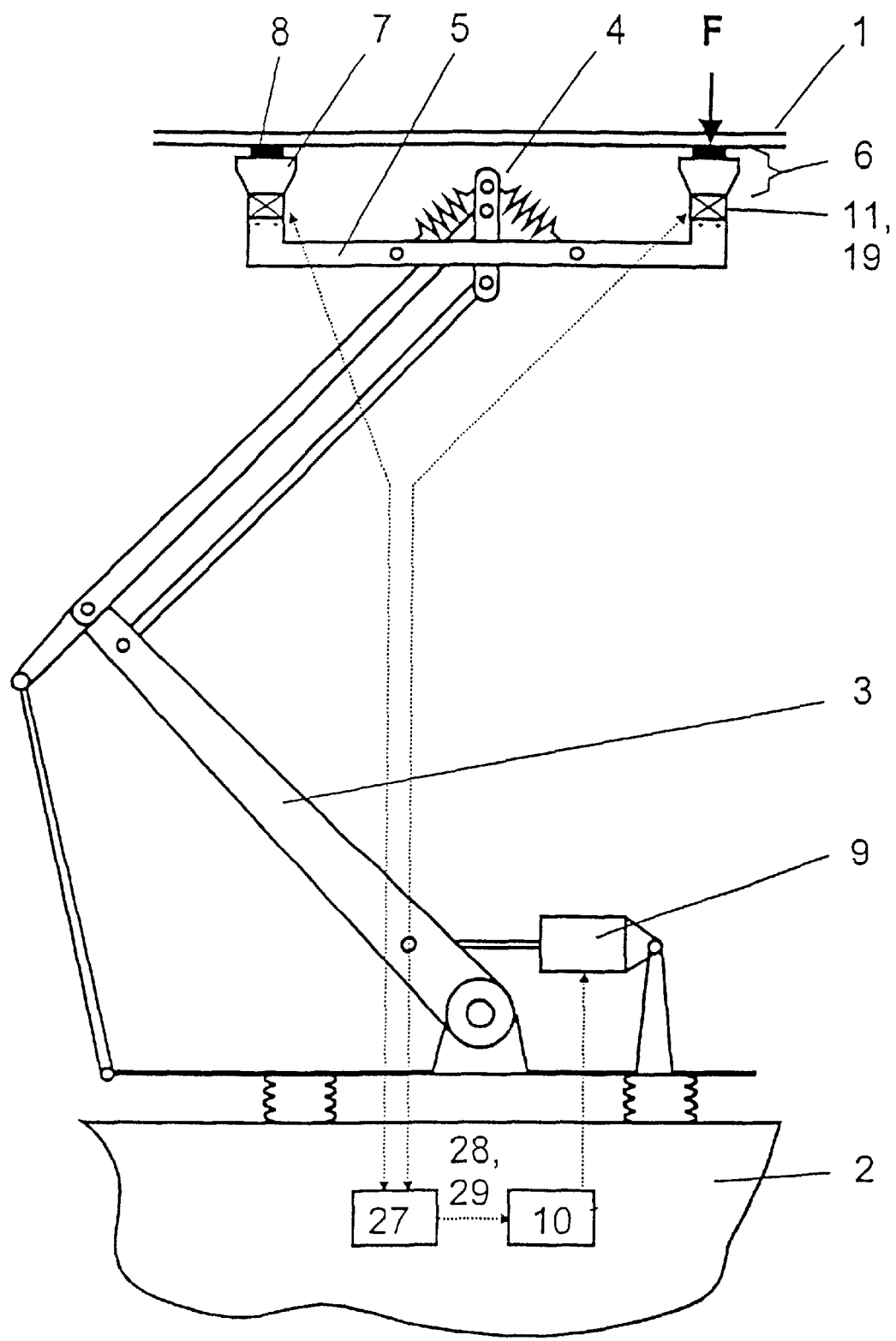
FIG. 1 is a view of the arrangement of a device according to the invention for a pantograph of a railway vehicle.

According to FIG. 1, a railway vehicle 2 has on its roof a pantograph 3, which is insulated from the high-voltage potential of the contact wire 1 and is in a single-arm embodiment. At its upper end, the pantograph elastically guides a rocker 4, which supports with its rocker frame 5 a pair of parallel contact strips 6, and guides them against the contact wire 1. The contact strips 6 essentially comprise a base body 7 and a shoe 8, which is fixedly connected to the base body and maintains the contact with the contact wire 1. A pantograph lifting drive 9 is coupled to the lower end of the pantograph 3; when actuated by its control device 10, this drive 9 is intended to press the contact strip 6 against the contact wire 1 with a defined contact force. The contact force that is established, however, is not a stationary value, but is subjected to constant changes because of the vehicle speed, the wind intensity and direction, the stationary position of the chain mechanism guiding the contact wire, and its pantographic, frictional and wind-induced oscillations, and the relative movement of the electric railway vehicle along its travel path. The maintenance of the contact force within the narrowest-possible force range is, however, essential for a non-interrupted energy transmission to the electric railway vehicle, and for the least-possible wear of the shoe and the contact wire, and becomes more significant and difficult as the vehicle speed and power increase. An active control of the pantograph with the objective of a contact-force course within the narrowest-possible, preferred tolerance band presupposes the most precise and continuous determination possible, with the measurement site being located as close as possible to the actual point of contact between the contact wire 1 and the shoe 8.

Figure 2:
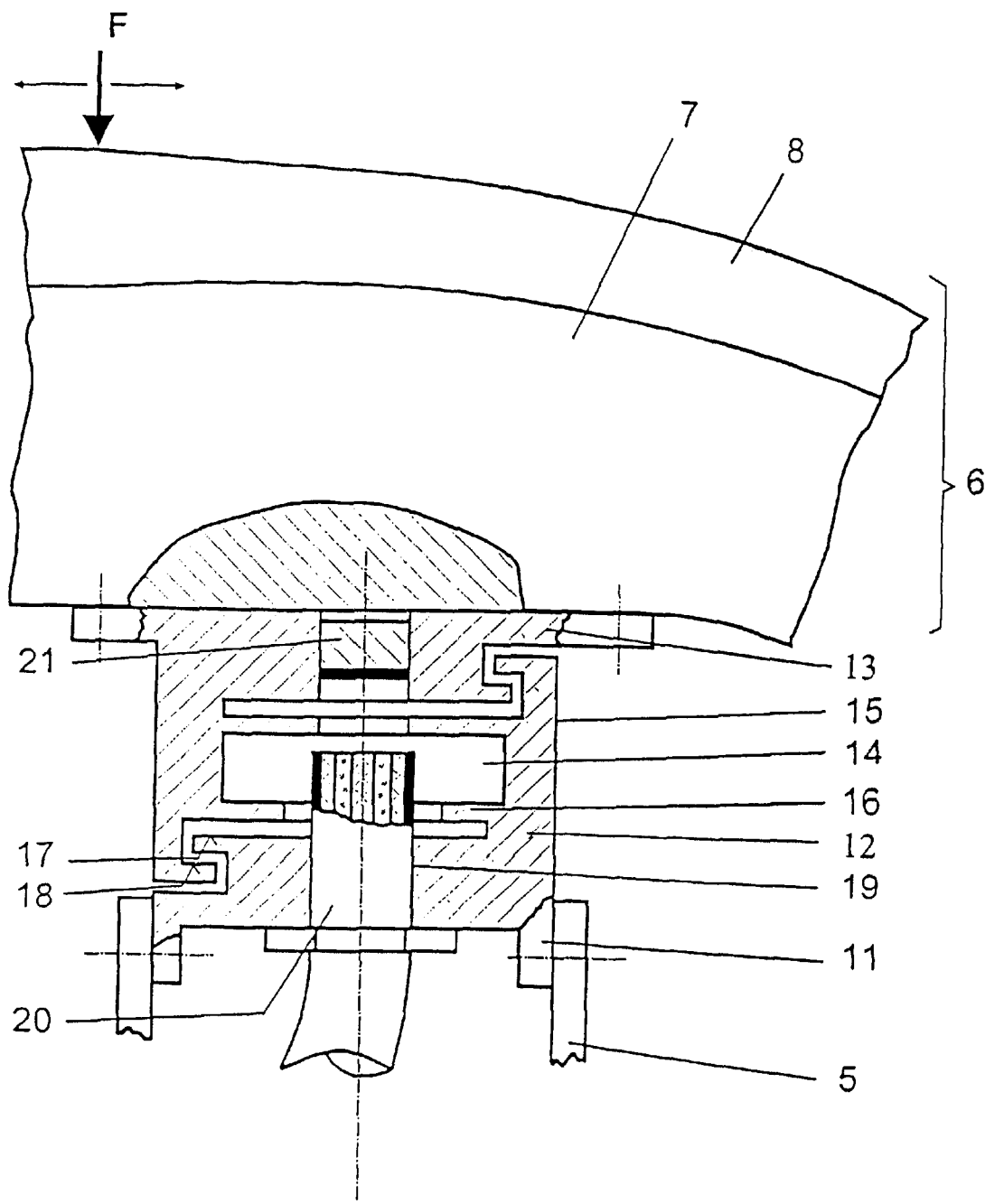
FIG. 2 is a sectional image of a portion of the arrangement and the structure of a device according to the invention.

According to the invention, in the variation shown in FIG. 2, one of the illustrated resilient deformation bodies 11 is mounted near each of the two ends of the contact strip 6, between their base body 7 and the rocker frame 5.

In accordance with another variation of the invention (not shown), the resilient deformation body 11 is to be disposed between the base body 7 and the shoe 8. The force that is measured with such an arrangement more closely approaches the true contact force, because the measuring device takes into account the force components from the wind-dependent and vehicle-speed-dependent air flow, which have a lifting or a negative lifting effect on the base body 7.

Integrated into the resilient deformation body is a fiber-optic reflex sensor 19 that is known per se and is connected to an associated device 27 for separate-potential control and processing of the sensor signals, the device being modified in a technical manner with respect to known applications. Whereas the rocker frame 5, the two resilient deformation bodies 11 and the contact strip 6 supported by these bodies assume the high-voltage potential of the contact wire 1, the device 27 for controlling and processing sensor signals transmits and receives electrically separate-potential signals on fiber-optic paths, and can therefore be built into the control of the electrical railway vehicle 2 at an arbitrary location, and at the opposite potential, and can supply the control device 10 of the pantograph lifting drive 9 with the contact-force-equivalent signals 28, or desired commands 29 that change the contact force, at the conventional control-signal potential.

Each resilient deformation sensor includes a first partial body 12, which is rigidly connected to the rocker frame 5, a second partial body 13, which is rigidly connected to the base body 7 of the contact strip 6, and a spring arrangement 14, which connects the two partial bodies 12 and 13 and permits a relative motion between the partial bodies 12 and 13 in the direction of the entering contact force F. The spring arrangement 14 is designed such that this motion between the partial bodies 12 and 13 is unimpeded within the desired measurement range of the component of the contact force F, which is transmitted from the base body 7 to the rocker frame 5, and acts by way of the individual resilient deformation body.

The fiber-optic reflex sensor 19 that is integrated into each resilient deformation body 11 by way of example essentially comprises two spatially-separate parts: A first insert 20, which is securely screwed into the first partial body 12 of the resilient deformation body 11, includes two optical fibers that extend parallel and at a fixed distance from one another; of these fibers, the transmitting optical fiber 22 guides a transmitted light beam 24 originating from the device 27, and allows the beam to exit its end face within a specific angle of radiation. At a spatial distance a, this light impacts the reflection surface 26, which is supported by a second insert 21 that is secured in the second partial body 13 of the resilient deformation body 11, and is reflected by the reflection surface 26 in the direction of the first insert 20.

Figure 3:
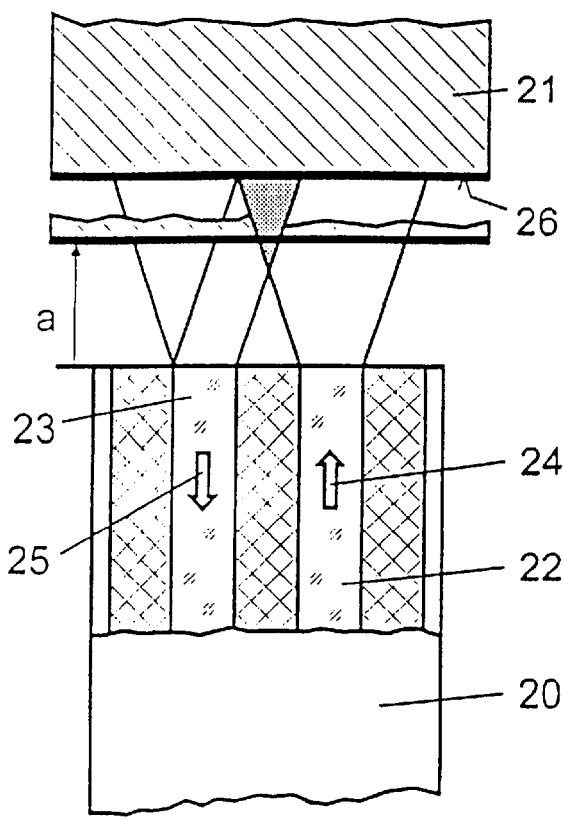
FIG. 3 illustrates the functioning principle of a fiber-optic reflex sensor.
Figure 4:
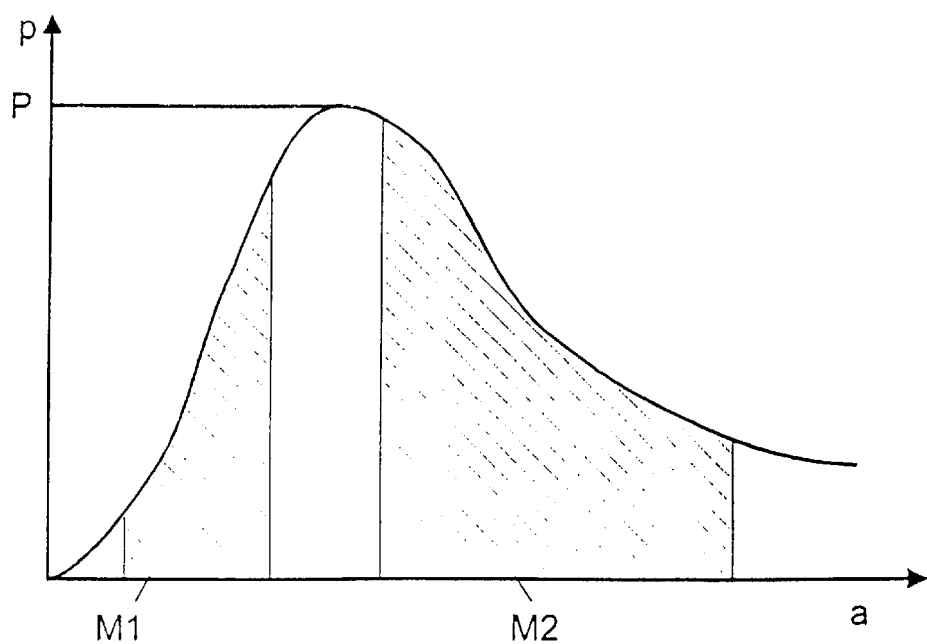
FIG. 4 shows the signal level/distance characteristic p=p (a) of the fiber-optic reflex sensor of a device according to the invention.

As can be seen from FIG. 3, a partial light flux that is dependent on the distance a between the two inserts 20 and 21 can be captured and supplied as a received light beam 25 to the device 27 for controlling and processing sensor signals.

If the fiber-optic reflex sensor 19 in the resilient deformation body 11 is oriented such that the reflection surface 26 extends orthogonally to the direction of the entering contact force F, the fiber-optic reflex sensor 19 detects the change in the reflected light flux, which occurs because of a change in the distance a between the first insert 20 and the reflection surface 26 due to a change in the contact force F, so the device 27 for controlling and processing sensor signals, after being calibrated appropriately, recognizes a change in the distance a between the inserts 20 and 21 of the relevant fiber-optic reflex sensor 19 from the change in the light-flux difference between the transmitted light beam 24 and the received light beam 25; from the summation of the signals of the two fiber-optic reflex sensors 19 respectively supporting the contact strip 6, the device determines the entering contact force F. According to its material and geometry, the resilient deformation body is embodied such that the fiber-optic reflex sensor 19 operates in one of the two measurement regions M1 or M2 of its signal level/distance characteristic p=p(a), which are shown on both sides of the signal-level maximum P.

The transmitting and receiving optical fibers 22 and 23 are advisably embodied as optical-fiber fiber bundles that can be separated once from one another (such as in FIG. 3), multiple times from one another, or disposed concentrically, or guided in a statistically-mixed fiber bundle.

According to another embodiment of the invention (not shown), the fiber-optic reflex sensor 19 in the resilient deformation body 11 is embodied such that the reflection surface 26 does not extend orthogonally, but parallel, to the direction of the entering contact force, so a deformation of the resilient deformation body 11 effects a shift in the reflection surface 26, in which the distance a from the first insert 20 remains unchanged. In the process, the reflection surface 26 should be disposed, for example, such that its edge is displaced by the overlap region of the transmitted light beam 24 and the received light beam 25 shown in FIG. 3. The fiber-optic reflex sensor 19 thereby detects the change in the reflected light flux that is effected by a change in the reflecting component of the reflection surface 26 due to a change in the contact force F.

A spring arrangement 14 that has proven particularly advantageous is the arrangement shown in FIG. 2, which includes a double leaf spring whose leaf springs 15 and 16 are clamped and stressed together at one end by means of the first partial body 12, and clamped and stressed together at the other end by means of the second partial body 13. On the one hand, a resilient deformation body of this type is flexible, and has a relatively-large, virtually-linear spring path in the direction of the vertically-entering contact force F to be measured, as well as a high elasticity, which permits a high resolution with a steep signal level/contact force characteristic and a high signal/noise ratio, with which interfering signals from the deformation body/component connecting points, inherent component vibrations and frictional oscillations between the contact wire and the shoe can be effectively suppressed. On the other hand, in the directions extending orthogonally to the contact force F to be measured, the deformation body has a high stability and tipping resistance with respect to transverse and longitudinal forces, which enter at the contact strip with, for example, wind loads of up to 1000 N in the horizontal plane, so the contact strip is guided in a stable manner under all conditions.

In one embodiment of the invention, the resilient deformation body 11 can be embodied in one piece, with its first partial body 12, its second partial body 13 and the double leaf spring 15/16, from the aforementioned material with high precision and reproducible properties (for example, through the use of mechanically-abrasive or electro-erosive wire machining or laser separation).

In a modification of the invention, the two partial bodies 12 and 13 can be reduced, and the resilient deformation body can be embodied to take up even less space and have less mass, if the two inserts 20 and 21 of the fiber-optic reflex sensor 19 are built directly into the adjacent pantograph components (i.e., in 5 and 7 or in 7 and 6) (not shown).

In accordance with a further modification of the invention, also not shown, it is possible not to join a resilient deformation body to the base body 7 of the contact strip, but to integrate it physically into the base body 7 or even into the shoe 8 of the contact strip 6, for example by inserting it into corresponding recesses. In a special embodiment of this type, the resilient deformation body 11 is worked into the material of the base body 7, and embodied in one piece with it, according to the aforementioned machining methods.

In a modification of the invention, to protect the resilient deformation body 11 against destruction due to excessive pressure forces or tensile forces, as may occur during the transport and installation of the pantograph, for example, or when the overhead-contact systems are damaged, specific stops 17 and 18 are embodied in the resilient deformation body 11 (FIG. 2).

Instead of the double leaf spring 15/16, conceivable spring arrangements for the resilient deformation body 11 include bending girders that are clamped on one or two sides, or the use of diaphragm springs having a closed surface or a plurality of partial surfaces.

To protect the threatened components of a device of the invention against mechanical and climatic environmental influences, according to a further modification of the invention, not shown, the resilient deformation body is provided with a tight cover to protect against these environmental influences, the cover being embodied so as not to impede the motion of the two partial bodies 12 and 13 relative to one another, and the action of the spring arrangement 14. This cover is preferably mounted, as an elastomer skin, through casting or gluing, for example.

The invention is not limited to electrical railway vehicles, or to single-arm pantographs or pantographs with or without a rocker, and with one or two contact strips of the illustrated type, but can also be applied to pantographs having a completely-different design of, for example, the shoe, contact strip, contact-strip support and/or lifting drive.

The principle of the solution according to the invention is also not limited to the determination of the vertically-entering contact force: A measuring arrangement having a similar deformation body and fiber-optic reflection sensor can be used to measure forces that enter at the pantograph in the longitudinal direction of the vehicle, or forces that enter at the pantograph in the transverse direction of the vehicle, for example in that deformation bodies of the exemplary embodiment are tipped by 90° such that the plane of the leaf spring is pivoted from the horizontal plane into a vertical plane extending transversely to the vehicle and parallel to the contact strip, or is pivoted into a vertical plane extending along the vehicle, and the deformation bodies are secured corresponding to this position. It is possible to combine two or three measuring arrangements that measure orthogonally to one another to be able to determine entering forces entirely as force vectors with respect to magnitude, point of entry and direction of entry.

The use of the invention is also not limited to the measurement of forces, but can easily be applied to the measurement of accelerations and pressures, and other technical fields involving such measurements in components set at a high-voltage potential.

List of Reference Characters

1 Contact wire
2 Electric railway vehicle
3 Pantograph
4 Rocker
5 Rocker frame
6 Contact strip
7 Base body
8 Shoe
9 Lifting drive
10 Control device
11 Resilient deformation body
12 First partial body
13 Second partial body
14 Spring arrangement
15 Leaf spring
16 Leaf spring
17 Stop
18 Stop
19 Fiber-optic reflex sensor
20 First insert
21 Second insert
22 Transmitting optical fiber
23 Receiving optical fiber
24 Transmitted light beam
25 Received light beam
26 Reflection surface
27 Device for sensor control and sensor-signal processing
28 Signals equivalent to the contact force
29 Commands equivalent to the desired change in contact force
a Distance
F Contact force
p Signal level
P Signal level maximum

What is claimed is:

1. A device for measuring the contact force between a contact wire and a pantograph of an electrically-powered vehicle, particularly an electrical railway vehicle, said device having at least one fiber-optic sensor for ascertaining a contact force between the contact wire and the contact strip of the pantograph and a device for sensor control and sensor-signal processing that is connected to the at least one sensor for separate-potential signal transmission; and wherein two resilient deformation bodies are disposed between a shoe and a base body of the contact strip and are fixedly connected to the shoe and the base body, with the deformation bodies supporting the shoe and each having an integrated fiber-optic reflex sensor that detects contact-force-equivalent deformations of the deformation body and signals them to the device for sensor control and sensor-signal processing.

2. The device according to claim 1, wherein the resilient deformation body has a first partial body, a second partial body and a spring arrangement that connects the first and second partial bodies to one another, with the arrangement permitting a contact-force-equivalent, relative motion between the first and second partial bodies in the direction of the contact force (F) entering the second partial body; and the fiber-optic reflex sensor is disposed in each resilient deformation body is oriented parallel to its direction of motion.

3. The device according to claim 1, wherein the resilient deformation body has a first partial body, a second partial body and a spring arrangement that permits a contact-force-equivalent, relative motion between the first and second partial bodies in the direction of the contact force (F) entering the second partial body; and the fiber-optic reflex sensor disposed in each deformation body is oriented orthogonally to its direction of movement.

4. The device according to claim 2, wherein the fiber-optic reflex sensor has a first insert, which is secured in the first partial body, and which has a transmitting optical fiber for a transmitted light beam and a receiving optical fiber for a received light beam, and a second insert, which is axially spaced by a distance (a) from the first insert and secured in the second partial body, and supports a reflection surface, with the light-exit surface of the transmitting optical fiber and the light-absorption surface of the receiving optical fiber being adjacent to one another, and opposite the reflection surface.

5. The device according to claim 4, wherein the fiber-optic reflex sensor detects the change in the reflected light flux, which is established by a contact-force-equivalent change in the distance (a) between the first insert and the reflection surface .

6. The device according to claim 1, wherein the resilient deformation body is integrated into the base body of the contact strip.

7. The device according to claim 1, wherein the resilient deformation body is integrated into the shoe of the contact strip.

8. The device according to claim 2, wherein the spring arrangement that connects the first and second partial bodies is a double leaf spring arrangement.

9. The device according to claim 8, wherein the resilient deformation body is embodied in one piece with the first partial body, the second partial body and the spring arrangement.

10. The device according to claim 9, wherein the resilient deformation body is embodied in one piece with the base body of the contact strip.

11. The device according to claim 8, wherein the resilient deformation body has stops, which mechanically limit the maximum possible motion of the partial bodies relative to one another.

12. The device according to claim 1, wherein a flexible, sealing cover protects the resilient deformation body against environmental influences.

13. The device according to claim 3, wherein the fiber-optic reflex sensor has a first insert, which is secured in the first partial body, and which has a transmitting optical fiber for a transmitted light beam and a receiving optical fiber for a received light beam, and a second insert, which is axially spaced by a distance (a) from the first insert and secured in the second partial body, and supports a reflection surface, with the light-exit surface of the transmitting optical fiber and the light-absorption surface of the receiving optical fiber being adjacent to one another, and opposite the reflection surface.

14. The device according to claim 13, wherein the fiber-optic reflex sensor detects the change in the reflected light flux, which is established by a contact-force-equivalent change in the reflecting part of the reflection surface.

15. A device for measuring the contact force between a contact wire and a pantograph of an electrically-powered vehicle, particularly an electrical railway vehicle, said device having at least one fiber-optic sensor that is suitable for ascertaining the contact force between a contact wire and a contact strip of the pantograph; and a device for sensor control and sensor-signal processing connected to the at least one fiber-optic sensor for separate-potential signal transmission; and wherein: first and second resilient deformation bodies are disposed between and fixedly connected to the contact strip and a rocker frame of the pantograph and support the contact strip; and each resilient deformation body has a respective integrated fiberoptic reflex sensor that detects contact-force-equivalent deformations of the deformation body and provides signals corresponding to the deformations to the device for sensor control and sensor-signal processing.

16. The device according to claim 15, wherein: each resilient deformation body has a first partial body connected to the contact strip, a second partial body connected to the rocker frame and a spring arrangement that connects the first and second partial bodies to one another to permit a contact-force-equivalent, relative motion between the first and second partial bodies in the direction of the contact force (F) entering the first partial body; and the respective fiber-optic reflex sensor disposed in each resilient deformation body is oriented parallel to its direction of motion.

17. The device according to claim 16, wherein the fiber-optic reflex sensor includes: a first insert that is secured in the second partial body and that has a transmitting optical fiber for a transmitted light beam and a receiving optical fiber for a received light beam; and a second insert that is axially spaced by a distance (a) from the first insert and secured in the first partial body, and that supports a reflection surface, with the light-exit surface of the transmitting optical fiber and the light-absorption surface of the receiving optical fiber being adjacent to one another, and opposite the reflection surface.

18. The device according to claim 17, wherein the fiber-optic reflex sensor detects the change in the reflected light flux, which is established by a contact-force-equivalent change in the distance (a) between the first insert and the reflection surface.

19. The device according to claim 16, wherein the spring arrangement that connects the first and second partial bodies is a double leaf spring arrangement.

20. The device according to claim 19, wherein the resilient deformation body has stops that mechanically limit the maximum possible motion of the first and second partial bodies relative to one another.

* * * * *